(12) United States Patent
Harris et al.

(10) Patent No.: US 7,444,329 B2
(45) Date of Patent: Oct. 28, 2008

(54) EVENT DRIVEN TRANSACTION STATE MANAGEMENT WITH SINGLE CACHE FOR PERSISTENT FRAMEWORK

(75) Inventors: Jason Harris, Mountain View, CA (US); Chia-Hsin Li, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 80 days.

(21) Appl. No.: 11/460,950

(22) Filed: Jul. 28, 2006

(65) Prior Publication Data
US 2006/0265432 A1 Nov. 23, 2006

Related U.S. Application Data

(62) Division of application No. 10/352,322, filed on Jan. 27, 2003, now Pat. No. 7,111,001.

(51) Int. Cl.
*G06F 17/30* (2006.01)
(52) U.S. Cl. .................... 707/5; 707/4; 707/202
(58) Field of Classification Search ............ 707/201, 707/202; 711/137
See application file for complete search history.

(56) References Cited

U.S. PATENT DOCUMENTS

| | | | |
|---|---|---|---|
| 5,727,203 A | 3/1998 | Hapner et al. | |
| 5,893,077 A | 4/1999 | Griffin | |
| 6,000,011 A | 12/1999 | Freerksen et al. | |
| 6,049,807 A | 4/2000 | Carroll et al. | |
| 6,256,637 B1 | 7/2001 | Venkatesh et al. | |
| 6,263,404 B1 | 7/2001 | Borkenhagen et al. | |
| 6,377,939 B1 | 4/2002 | Young | |
| 6,499,048 B1 | 12/2002 | Williams | |
| 7,188,344 B1* | 3/2007 | Blue ..................... | 718/106 |
| 2001/0037413 A1 | 11/2001 | Uehara et al. | |
| 2002/0059414 A1 | 5/2002 | Katz et al. | |
| 2002/0073082 A1 | 6/2002 | Duvillier et al. | |
| 2002/0073110 A1 | 6/2002 | Duvillier et al. | |
| 2002/0099765 A1 | 7/2002 | Otis | |
| 2002/0103814 A1 | 8/2002 | Duvillier et al. | |
| 2002/0103815 A1 | 8/2002 | Duvillier et al. | |
| 2002/0103819 A1 | 8/2002 | Duvillier et al. | |

OTHER PUBLICATIONS

Persistent Caching: An Implementation Technique for Complex Objects with Object Identity IEEE Transactions on Software Engineering, vol. 18, No. 7, Jul. 1992, pp. 631-645.

* cited by examiner

*Primary Examiner*—Yicun Wu

(57) ABSTRACT

A method for managing transactions associated with a persistent framework in a multi-thread environment is provided. The method initiates with associating each individual thread with an event queue. Then an event is added to a first event queue associated with a respective thread. The event is associated with a persistent object. Next, write access to the persistent object is prevented to all threads except the respective thread. Then, the event in the first event queue associated with the persistent object is executed. A computer readable media and a system capable of maintaining transaction states of persistent objects are also provided.

10 Claims, 14 Drawing Sheets

EVENT DRIVEN TRANSACTION STATE MANAGEMENT WITH SINGLE CACHE FOR PERSISTENT FRAMEWORK

CONTINUING APPLICATION DATA

This application is a divisional of, and claims priority under 35 U.S.C. § 120 on, U.S. patent application Ser. No. 10/352,322, filed Jan. 27, 2003, which is hereby incorporated by reference in its entirety.

BACKGROUND OF THE INVENTION

1. Field of the Invention

This invention relates generally to information storage and retrieval systems and more particularly to a method and system for managing the data being processed in the information and retrieval system.

2. Description of the Related Art

The advent of electronic commerce and developments in computer networking have provided opportunities for the management of the data being processed through the databases associated with these networks. Conventional databases, e.g., relational databases, object databases, hierarchical databases, flat files, etc. may be used to retrieve information for an application. These databases will have the capability of persistent storage, i.e., the storage of the data is independent of the application state. With reference to object oriented software, the software for managing the transactions occurring through a storage system must maintain the transaction state of all persistent objects.

FIG. 1 is a simplified schematic diagram of a persistent framework. Database 100 contains data in tabular format, such as database table 102. Database table 102 includes a number of fields. For example, with respect to a sales application, the fields of database table 102 may include identification numbers, product numbers, product description, etc. As customers may be ordering products and changing existing orders saved in the persistent framework, the transactions must be managed in an orderly fashion. Table 104 is shown for illustrative purposes only and one skilled in the art will appreciate that the data the application uses comes from the persistent objects created by the application. Objects 106*a*-106*n* are associated with corresponding rows of database table 102. For example, client 108 may change a previously ordered item through modification 109, which is captured by the corresponding persistent object, i.e., object 1 106*a*. The modification captured by object 1 106*a* is then committed to database table 102 to update the corresponding order in the database table.

At certain points in time, there are differences between what is stored in database 100 and the data in application (illustratively represented by table 104). One commonly used method for managing the differences between data an application is using, relative to the data in persistent storage, is the use of multiple caches and transaction states where a single cache is associated with a single state. That is, each cache stores persistent objects associated with a particular transaction state object or attribute. For example, all objects having an old-dirty status are stored in one cache; objects having an old-clean status are stored in another cache and so on.

One shortcoming of the multiple cache technique is that multiple threads, multiple users, etc., can not be supported. For instance, saving changes made by a particular thread is not possible as the objects associated with a particular thread are dispersed throughout multiple caches. In addition, the order in which persistent objects were modified or created is not preserved. Another shortcoming of the multiple cache technique is that a search for a particular object requires searching each cache, which makes searching for particular objects difficult and complex.

Another technique of managing the differences between data an application is using, relative to corresponding data in persistent storage, is the use of a single large cache. Each persistent object is given an additional attribute to storage for its current transaction state. In the previously mentioned technique, a separate cache is used for each set of persistent objects belonging to the same transaction state. As with the multiple cache technique, saving changes for a particular thread is not possible with the single large cache. Additionally, the entire cache must be scanned to determine the appropriate action to take upon a commit or rollback operation.

As a result, there is a need to solve the problems of the prior art to provide a method and system for efficiently managing transactions in a persistent framework.

SUMMARY OF THE INVENTION

Broadly speaking, the present invention fills these needs by providing a method for managing the modification of persistent objects in a multi-user environment. It should be appreciated that the present invention can be implemented in numerous ways, including as a process, a system, or a device. Several inventive embodiments of the present invention are described below.

In one embodiment, a method for managing transactions associated with a persistent framework in a multi-thread environment is provided. The method initiates with associating each individual thread with an event queue. Then, an event is added to a first event queue associated with a respective thread. The event is associated with a persistent object. Next, write access to the persistent object is prevented to all threads except the respective thread. Then, the event in the first event queue associated with the persistent object is executed.

In another embodiment, a method for maintaining transaction states of persistent objects in a multi-user environment is provided. The method initiates with receiving a request to modify a persistent object stored in a main cache. Then, the persistent object is copied from the main cache to an event queue associated with the request. Next, a modified persistent object and a corresponding transaction state are stored with the persistent object in the event queue. Then, the modified persistent object written to the main cache and a persistent storage. Next, the persistent object is removed from the main cache and the persistent storage.

In yet another embodiment, a method for maintaining transaction states of persistent objects capable of being accessed by a plurality of clients is provided. The method initiates with associating each one of a plurality of clients with an event queue. Each event queue is associated with a single cache of a persistent framework. Then, modification of a persistent object to a modified persistent object is requested. The persistent object is stored in the single cache. Next, the modified persistent object, a transaction state indicator and a copy of the persistent object are stored in a respective event queue in a manner to preserve an order of successive modifications of additional persistent objects stored in the respective event queue. Then, write access to the persistent object stored in the single cache is prevented for a remainder of the plurality of clients. Next, the modified persistent object in the respective event queue is committed to the single cache.

In still yet another embodiment, a computer readable storage medium executable on a computer system is provided.

The computer readable storage medium includes program instructions for associating each individual thread with an event queue. Program instructions for adding an event to a first event queue associated with a respective thread are also included. Here, the event is associated with a persistent object. Program instructions for preventing write access to the persistent object for all threads except the respective thread and program instructions for executing the event in the first event queue associated with the persistent object are included.

In another embodiment, a computer readable storage medium having program instructions for maintaining transaction states of persistent objects capable of being accessed by a plurality of clients is provided. The computer readable media includes program instructions for associating each one of a plurality of clients with an event queue, where each event queue is associated with a single cache of a persistent framework. Program instructions for requesting modification of a persistent object to a modified persistent object are provided. The persistent object being stored in the single cache. Program instructions for storing the modified persistent object, a transaction state indicator and a copy of the persistent object in a respective event queue in a manner to preserve an order of successive modifications of additional persistent objects stored in the respective event queue are included. Program instructions for preventing write access to the persistent object stored in the single cache for a remainder of the plurality of clients are provided. Program instructions for committing the modified persistent object in the respective event queue to the single cache are also provided.

In yet another embodiment, a system capable of maintaining transaction states of persistent objects is provided. The system includes a persistent storage unit. Also included in the system is a server in communication with the persistent storage unit. The server includes at least one central processing unit (CPU). The CPU includes a main cache configured to store persistent objects. The main cache is associated with a plurality of event queues, where each of the event queues are associated with a separate thread. Each of the event queues are further configured to store data, which includes copies of each of the persistent objects from the main cache, modifications corresponding to respective copies of the persistent objects, and transaction states corresponding to each of the copies of the persistent objects. The event queue is enabled to allow execution of at least a subset of the modifications stored therein.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DESCRIPTION OF THE PREFERRED EMBODIMENTS

Figure 1:
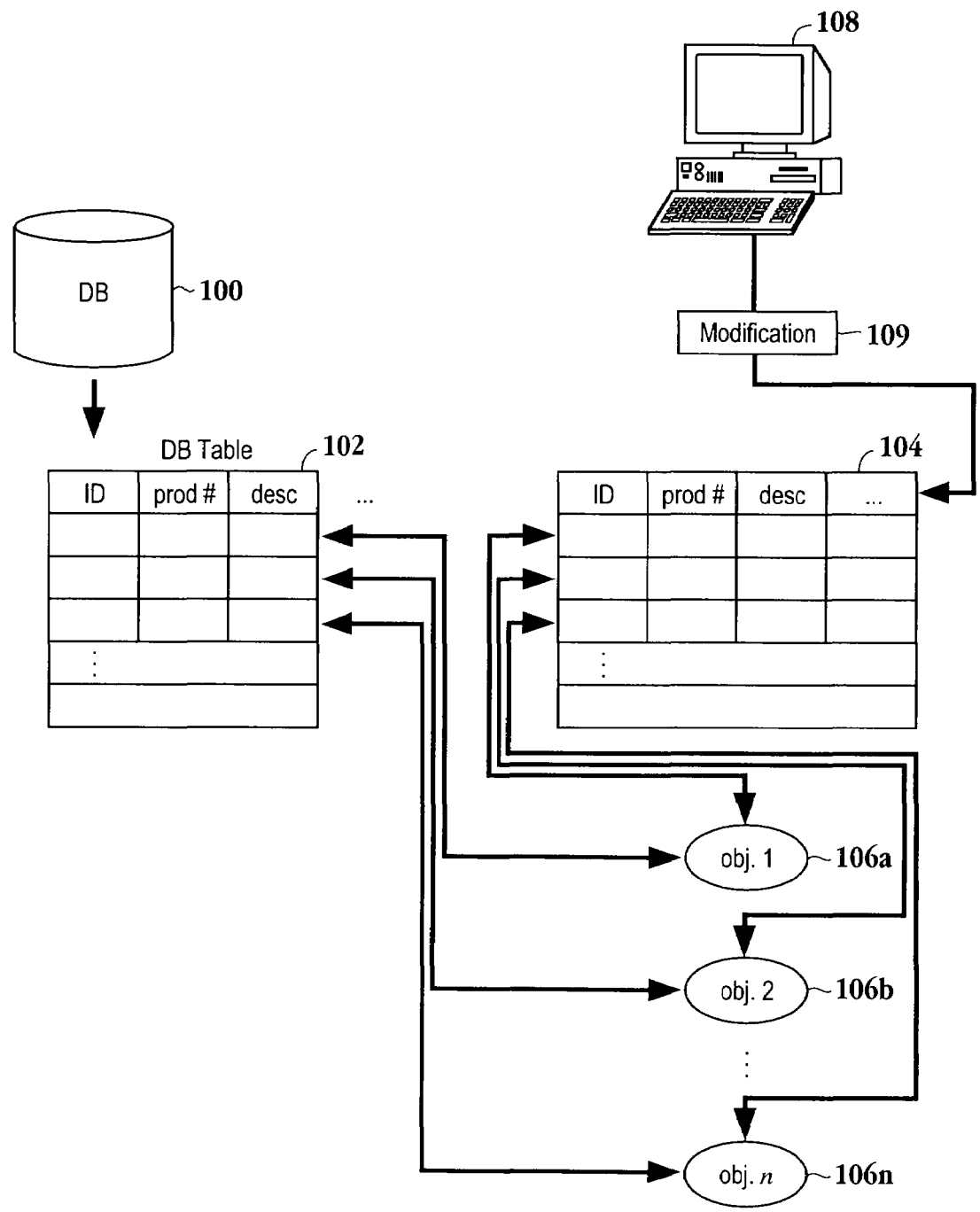
FIG. 1 is a simplified schematic diagram of a persistent framework.

An invention is described for a system and method for managing persistent objects of a persistent storage framework. It will be obvious, however, to one skilled in the art, that the present invention may be practiced without some or all of these specific details. In other instances, well known process operations have not been described in detail in order not to unnecessarily obscure the present invention. FIG. 1 is described in the "Background of the Invention" section. The term about as used to herein refers to +/−10% of the referenced value.

The embodiments of the present invention provide a method and apparatus for managing persistent storage where persistent objects may be modified, e.g., changed, added, or deleted, by multiple users in a multi-thread environment. The management technique uses a single cache, also referred to as a main cache, to store persistent objects that have been read from a persistent storage mechanism. In one embodiment, a most recently used (MRU) method is used to manage the quantity of persistent objects in the single cache. That is, as the single cache approaches its storage capacity, the most recently used persistent objects are kept in the single cache, while older persistent objects are transferred to the persistent storage mechanism. Exemplary persistent storage mechanisms include relational databases, object databases, hierarchical databases, flat files, etc. An event queue is used to store the transaction state of each of the persistent objects and the order in which a persistent object is added, deleted or changed. In a multi-thread environment, each thread, also referred to as a session, that performs modifications to a persistent object is associated with a separate event queue. Thus, the transaction state is decoupled from the single cache through the use of the event queue.

The management technique also includes the capability of preventing write access to an object being modified. In one embodiment, this is accomplished by placing a lock on a persistent object in the main cache or persistent storage mechanism whenever a session adds, changes or deletes the persistent object. Accordingly, the session causing the lock to be placed on the persistent object has exclusive read/write access to the persistent object, while other sessions are provided with read only access. Of course, a persistent object that is locked in the main cache, remains in the main cache until a commit or rollback operation is performed by the session which locked the persistent object. After the commit or rollback operation, the lock is removed from the persistent object, thereby allowing other sessions to perform modifications on that object. It should be appreciated that the terms session, thread, and client are interchangeable as used herein.

Figure 2:
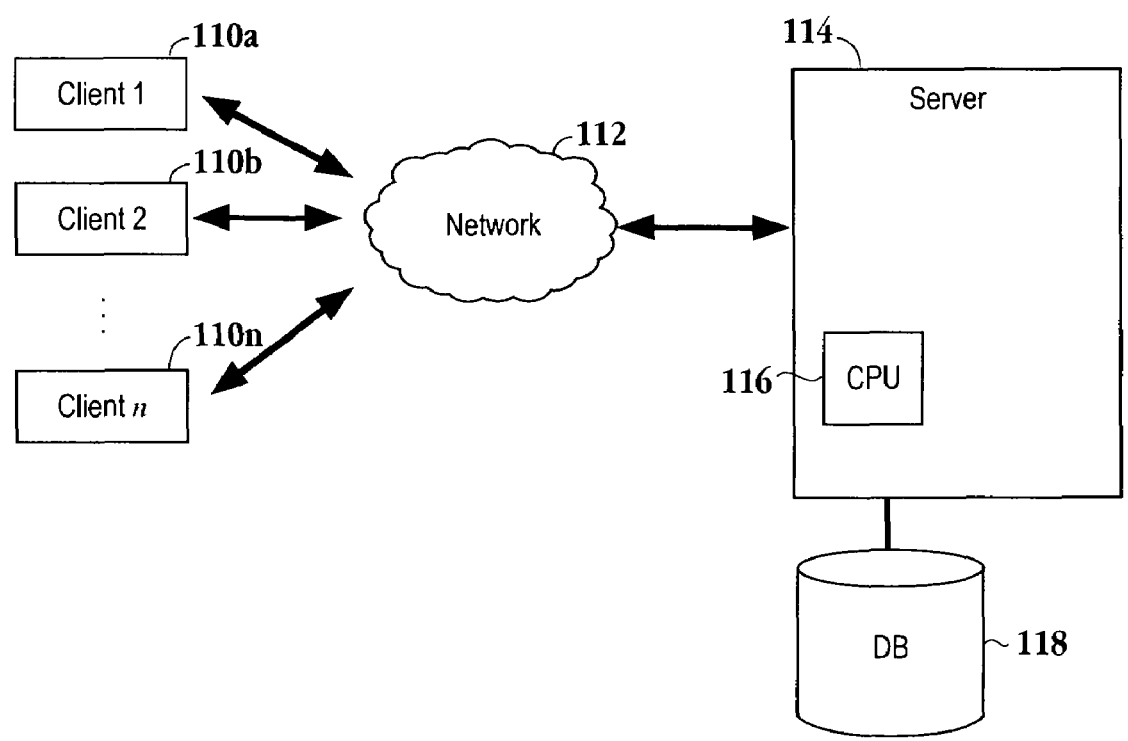
FIG. 2 is a simplified schematic diagram of a system configured to manage persistent objects in accordance with one embodiment of the invention.

FIG. 2 is a simplified schematic diagram of a system configured to manage persistent objects in accordance with one embodiment of the invention. Client 1 110a through client n 110n are in communication with server 114 through distributed network 112, e.g., the Internet. Server 114 includes central processing unit (CPU) 116. In one embodiment, server 114 includes multiple CPUs. CPU 116 is configured to execute the management techniques for the persistent objects as discussed herein. Server 114 is in communication with database 118. Database 118 is configured to provide persistent storage for persistent objects. For example, database 118 may be a relational database, an object database, a hierarchical database, flat files, etc. It should be appreciated that the system described with reference to FIG. 2 may include enterprise resource planning (ERP) systems directed to sales, financial, accounting systems, human resource planning or any other function of a business organization utilizing a persistent framework.

In one embodiment, clients 1-n 110a-110n are configured to transmit sales orders to server 114. Accordingly, at certain points in time there will be differences between the data in database 118 and the data being processed by the application being executed on sever 114. For example, a customer may have an order for a certain number of items in database 118. Prior to the delivery of the items, the customer may decide to increase the amount of items ordered. Thus, while the original order is being increased through the application on server 118, the modification of the original order is not captured in database 118 until the modification is committed to the database. It should be appreciated that reference to a sales application throughout the discussion of the Figures is for exemplary purposes only and not meant to be limiting as the management scheme may be applied to any suitable application.

Figure 3A:
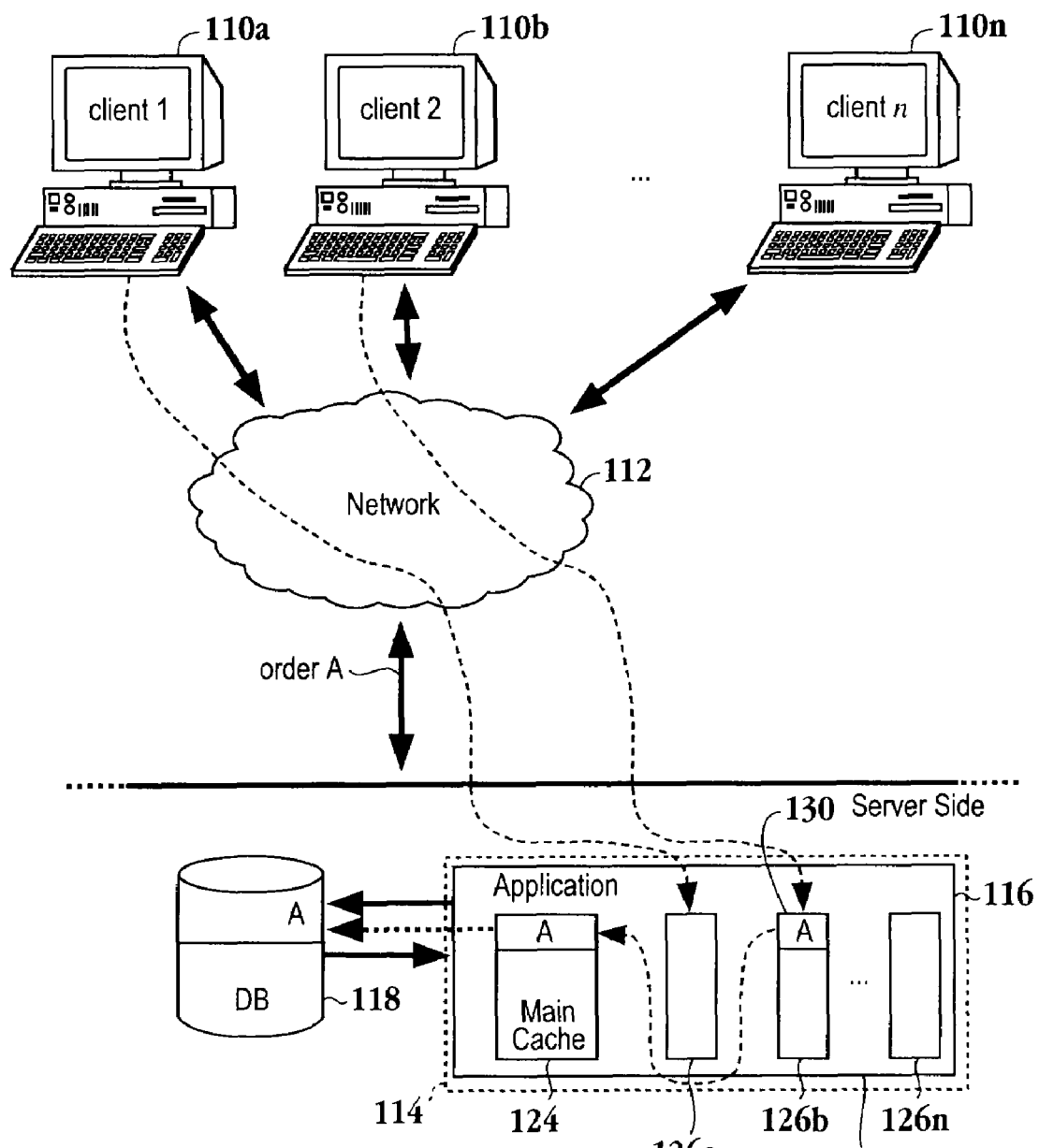
FIG. 3A is a more detailed diagram of the server side of the system configured to manage persistent objects of FIG. 2.

FIG. 3A is a more detailed diagram of the server side of the system configured to manage persistent objects of FIG. 2. Clients 1-n 110a-110n communicate sales data to server 114 over network 112. In a particular example, client 2 110b transmits order A to server 114. Order A is stored in event queue 2 126b and main cache 124. In one embodiment, event queue 2 126b is configured as a stack. Committal of the event for adding order A by client 2 results in a copy of order A being stored in database 118. It should be appreciated that each of clients 1-n 110a-110n, are associated with event queues 126a-126n, respectively. That is, there is a one to one correspondence between the event queues and the clients as each client is associated with a separate event queue.

Figure 3B:
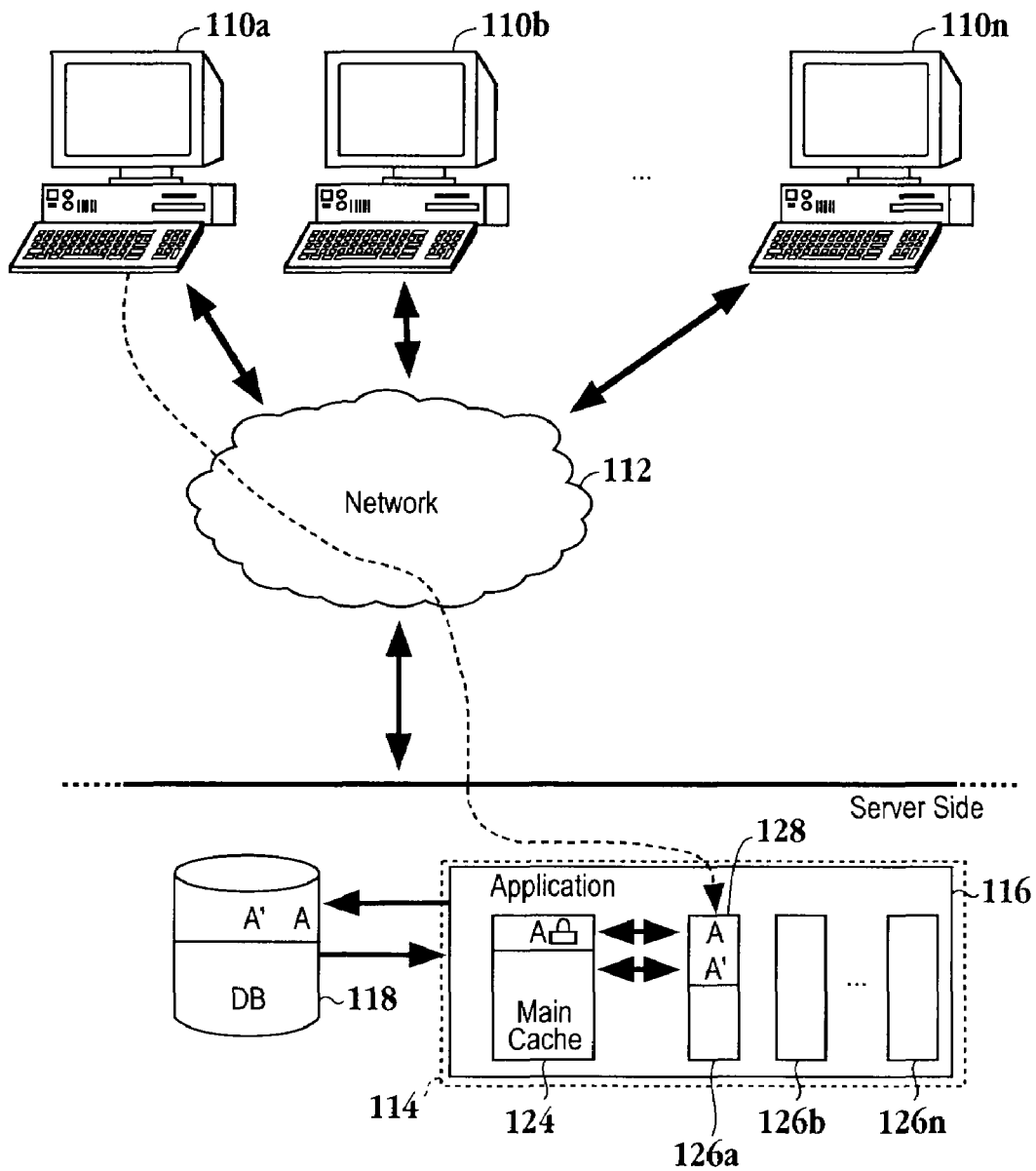
FIG. 3B is a schematic diagram illustrating the technique for managing a modification of the persistent object added in FIG. 3A in accordance with one embodiment of the invention.

FIG. 3B is a schematic diagram illustrating the technique for managing a modification of the persistent object added in FIG. 3A in accordance with one embodiment of the invention. It should be appreciated that FIG. 3B is an extension of FIG. 3A in that added sales order A of FIG. 3A is being modified in FIG. 3B. Here, client 110a is transmitting data to modify order A to order A'. For example, the party initiating order A may desire to change the quantity of sales items being delivered, the delivery date, or any other data associated with the sales data. The modification data (order A') is stored in block 128 of event queue 126a. Here, upon receipt of the corresponding data in event queue 126a, a lock is placed on order A in main cache 124 and order A' may be copied to the main cache replacing order A. It should be appreciated that order A may be stored in the persistent storage mechanism, i.e., database 118, and not in main cache 124, especially if order A is an older persistent object and a MRU technique is used to manage main cache 124. If order A is not stored in main cache 124, then a copy of order A from database 118 is placed into the main cache. In one embodiment, a lock is placed on order A as order A is copied into main cache 124. Upon committal of the data of block 128 of event queue 126a the lock on order A is removed and order A is replaced with order A' in main cache 124 and/or database 118. It should be appreciated that each event queue provides a chronology of the events stored in the event queue. In one embodiment, successive modifications are added to the bottom of each event queue 126a-126n to maintain the order of events. Thus, events added at an earlier time are located towards the top of the event queue, while events added later are located towards the bottom of the event queue.

Figure 4A:
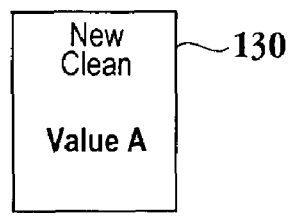
FIG. 4A is a block diagram illustrating the data contained within a block of the event queue when a new value is added in accordance with one embodiment of the invention.

FIG. 4A is a block diagram illustrating the data contained within a block of the event queue when a new value is added in accordance with one embodiment of the invention. Here, a transaction state indicator which identifies order A as a new event and the value of order A, i.e., the data associated with order A with reference to FIG. 3A, are both included in block 130. It should be appreciated that coupling the transaction state indicator to the data and by associating each client with an individual event queue allows the management technique described herein to maintain the persistent objects in an efficient and orderly manner. That is, the transaction states are not stored in the main cache, rather the transaction states are stored in the respective event queue, which is associated with a particular client. Additionally, once a client commits or rollbacks a transaction, only the event queue associated with the client is scanned to update the main cache and the persistent storage. Therefore, the amount of data to upload for a commit or a rollback operation is significantly reduced.

Figure 4B:
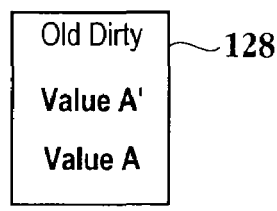
FIG. 4B is a block diagram illustrating the data contained within a block of the event queue for modifying an existing value in accordance with one embodiment of the invention.

FIG. 4B is a block diagram illustrating the data contained within a block of the event queue for modifying an existing value in accordance with one embodiment of the invention. Block 128 includes a transaction state, data for order A', and data for order A, which is being updated by order A', with reference to FIG. 3B. One skilled in the art will appreciate that the transaction states may be configured to cover any type of transaction, e.g., add, change, or delete transactions. Exemplary transaction states include new-clean, new-dirty, new-delete, old-clean, old-dirty, old delete, or any other suitable indicator for identifying a state of a transaction. The transaction states indicate actions required upon commit or rollback operations. As illustrated in FIG. 4B, the data for the original order A, and the data for the modified order A' are both included, therefore, in the case of a rollback operation the data for original order A is readily available, if needed. In addition, searching is simplified under this configuration.

Figure 5A:
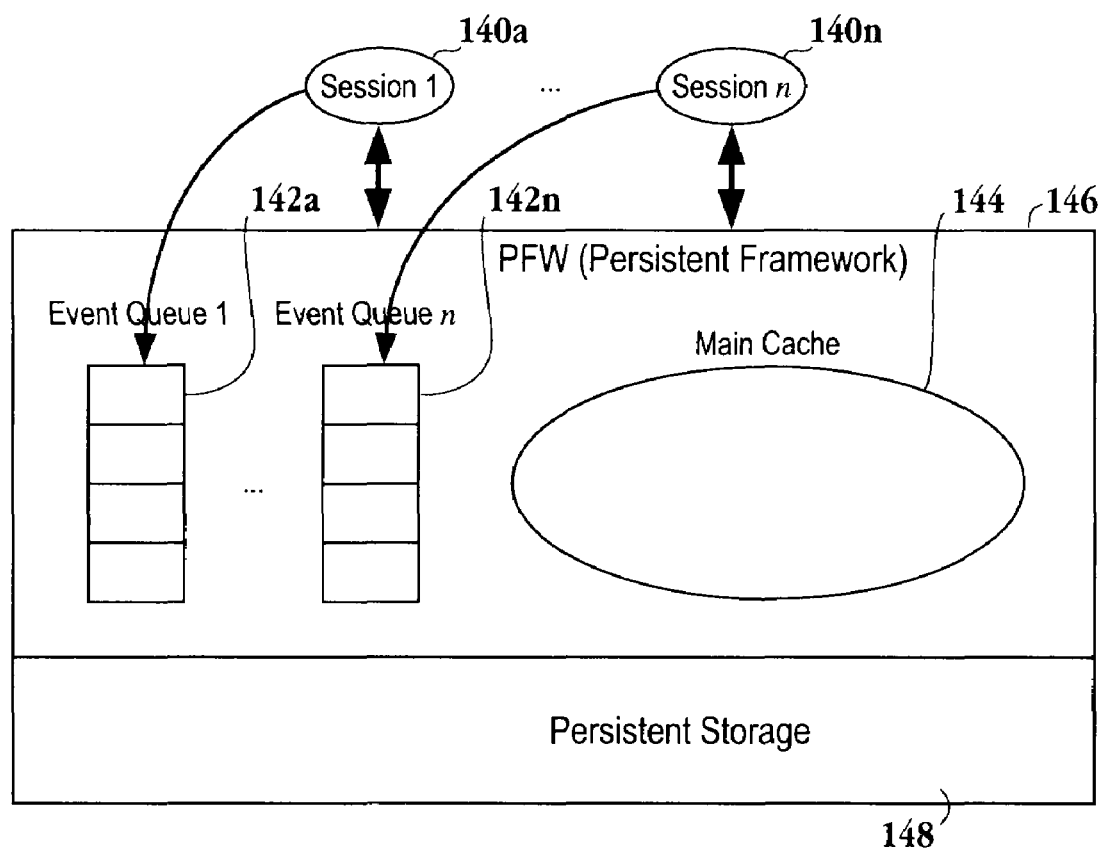
FIGS. 5A through 5H are schematic diagrams illustrating a management technique for handling modifications to persistent objects of a persistent framework in accordance with one embodiment of the invention.

FIGS. 5A through 5H are schematic diagrams illustrating a management technique for handling modifications to persistent objects of a persistent framework in accordance with one embodiment of the invention. FIG. 5A illustrates persistent framework 146 having a main cache 144 and event queue 1 142a through event queue N 142n. Event queue 1 142a is associated with session 1 140a, while event queue N 142n is associated with session n 140n. It should be appreciated that session 1 140a through session N 140n may represent threads or clients. Accordingly, persistent framework 146 represents the server side, while session 1 140a through session n 140n represents the client side. It will be apparent to one skilled in the art that the client side is in communication with the server side through a network. Furthermore, session 1 140a through session N 140n may be associated with client 1 110a through client n 110n, respectively, of FIG. 2. As illustrated, each session is associated with a single event queue. Persistent storage 148 is also included in persistent framework 146. As mentioned above, persistent storage 148 may be configured as a database, e.g., a relational database, a hierarchal database, an object database, etc.

Figure 5B:
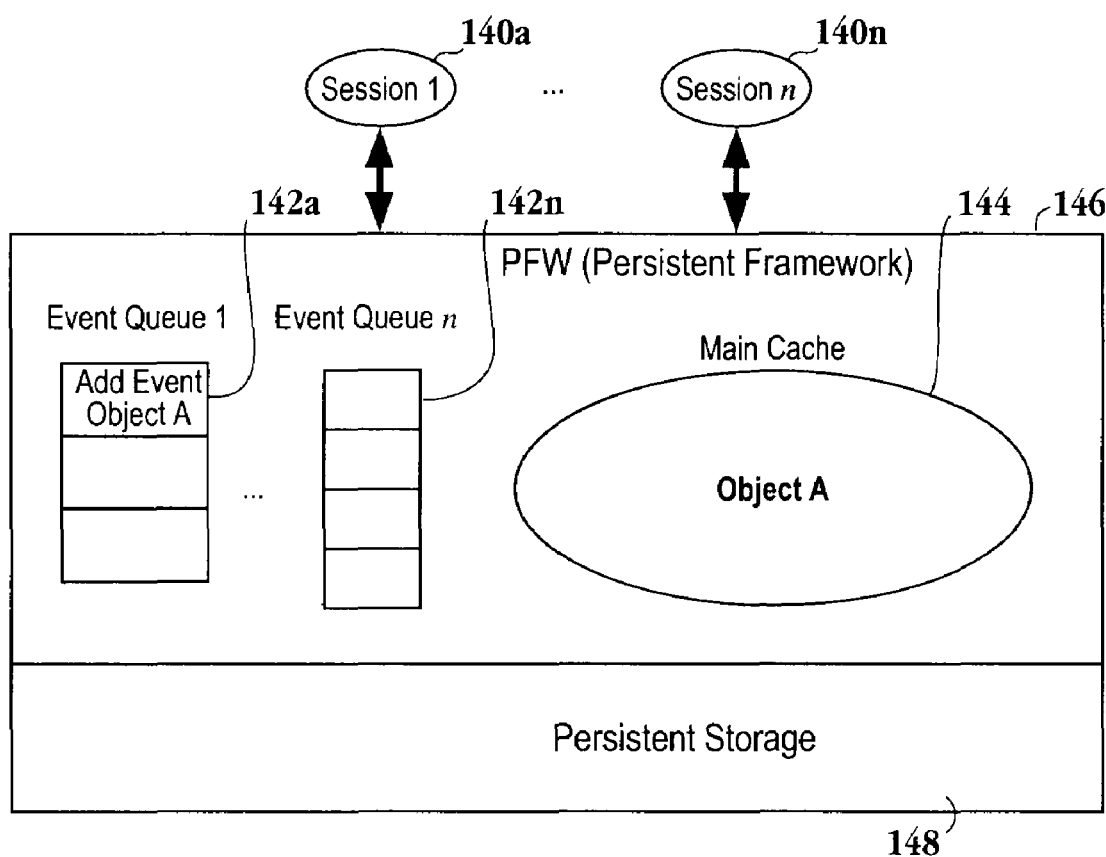
Figure 5C:
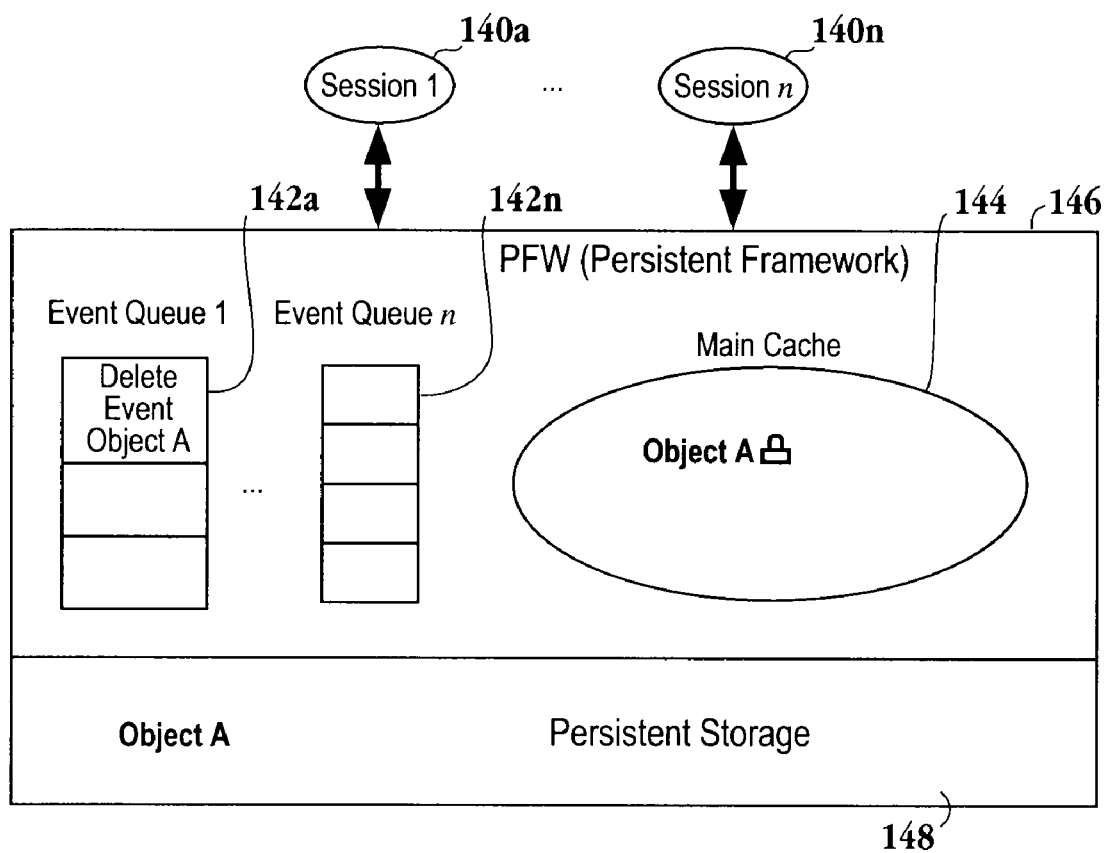

FIG. 5B represents a schematic diagram in which a new persistent object is added. That is, a persistent object that is not in persistent storage 148 is added here. Here, session 1 140*a* is used to add event object A to event queue 1 142*a*. As new persistent object A is added, the object is added to main cache 144. In one embodiment, if the associated event queue is full when an add-event occurs, the oldest event is saved to persistent storage and removed from the event queue. Alternatively, the last change is discarded. FIG. 5C is a schematic diagram illustrating a snapshot of the persistent framework when deleting object A. Here, FIG. 5C represents the state of the persistent framework prior to committing the delete event. Through session 1 140*a*, a delete event is received by event queue 1 142*a*. It should be appreciated that the delete event includes a copy of the deleted object, i.e., object A. Additionally, a lock is placed on the corresponding object (object A) so that another session is unable to have write access to the object in the main cache associated with the delete event. It should be appreciated that after a commit operation, object A will be eliminated from main cache and from event queue 1 142*a*.

Figure 5D:
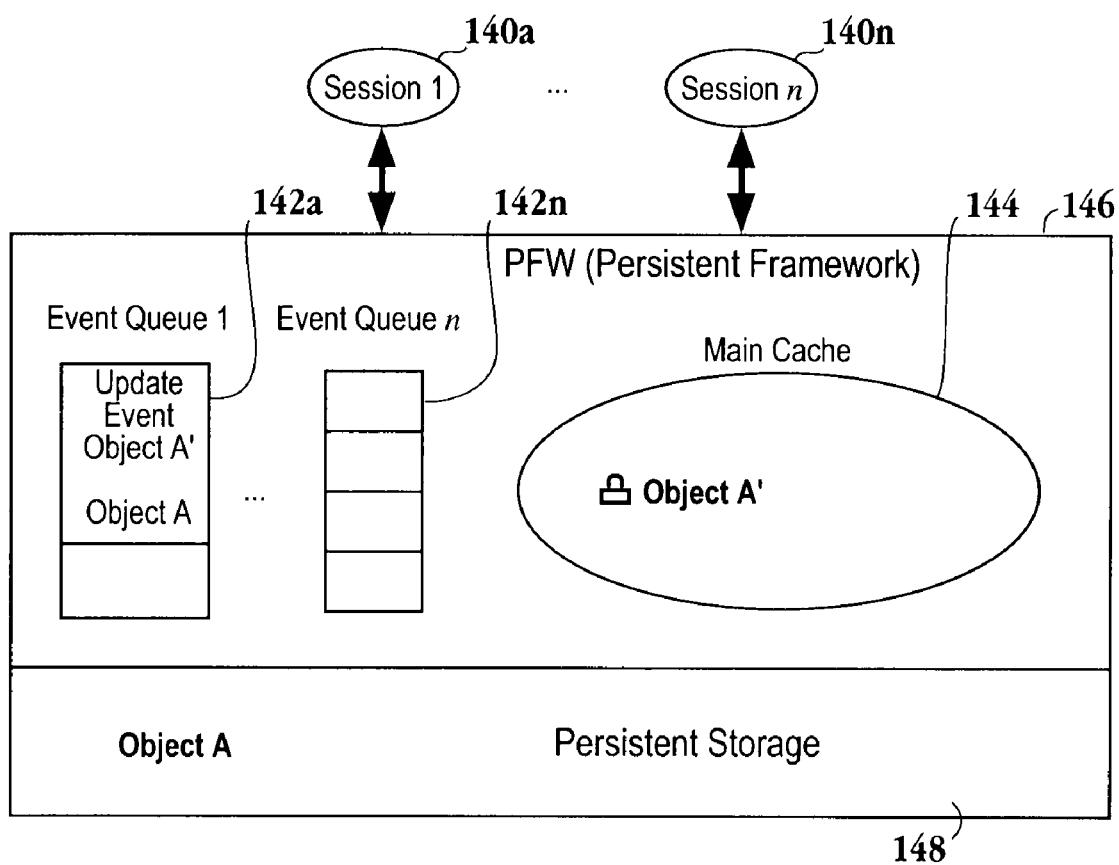

FIG. 5D illustrates a schematic diagram of the persistent framework after updating an object but prior to committing the update. Here, session 1 140*a* is used to provide an update to object A in persistent storage 148. Accordingly, an update event is added to event queue 1 142*a* having object A, object A' and the corresponding transaction state. In one embodiment, the value of the modified object is updated in the main cache. In another embodiment, if the object does not exist in the main cache, its new value is added to the main cache. One skilled in the art will appreciate that depending on the connection speed, memory resources, etc., the persistent object may be read from persistent storage 148 or main cache 144. The order of the updated event is maintained by adding the event to the end of the corresponding event queue, in accordance with one embodiment of the invention. Thus, updated event for event queue 1 142*a* is added to the end of the invent queue in this embodiment. It should be appreciated that event queue 1 142*a* includes the old value of the persistent object and the updated value. One skilled in the art will appreciate that having the old value and the updated value in the event queue will allow for accommodation of both a rollback operation and a commit operation. In one embodiment, any time an object is in both an event queue 142 and main cache 144, a lock is placed on the respective object in the main cache.

Figure 5E:
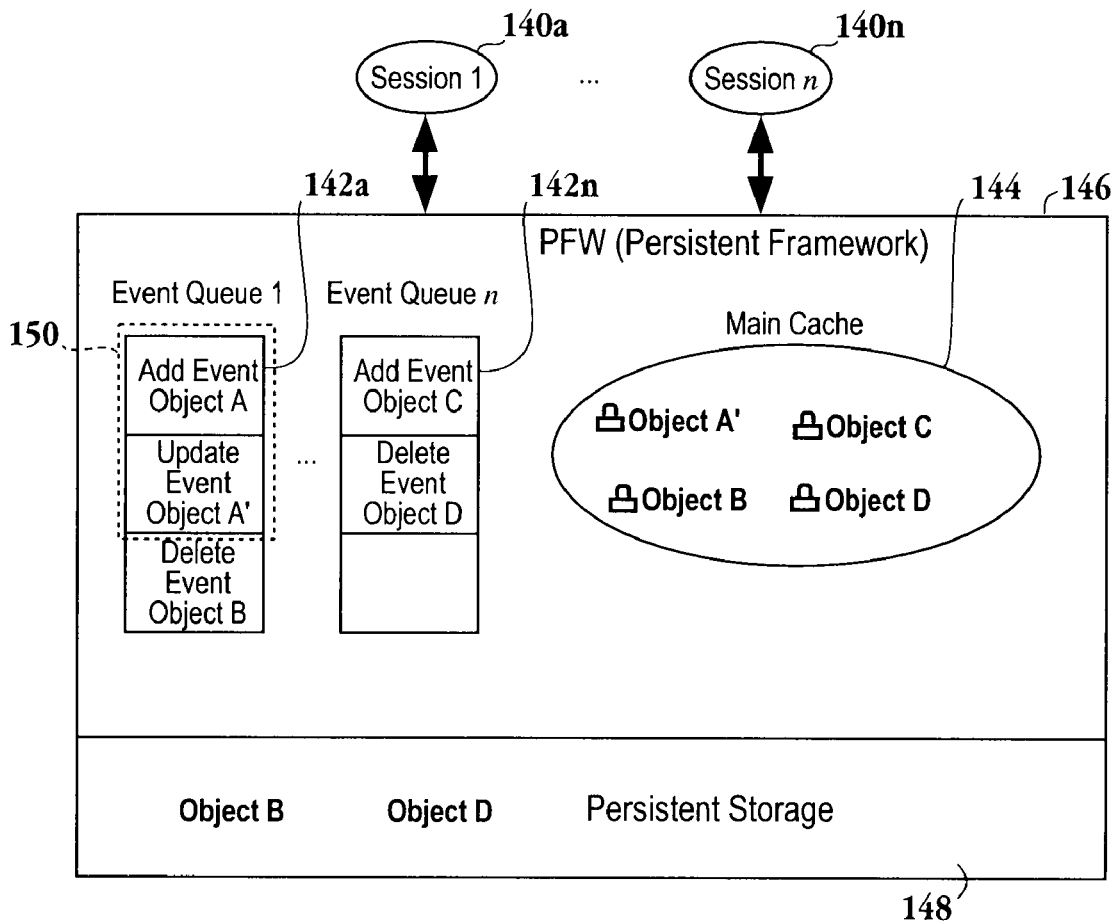
Figure 5F:
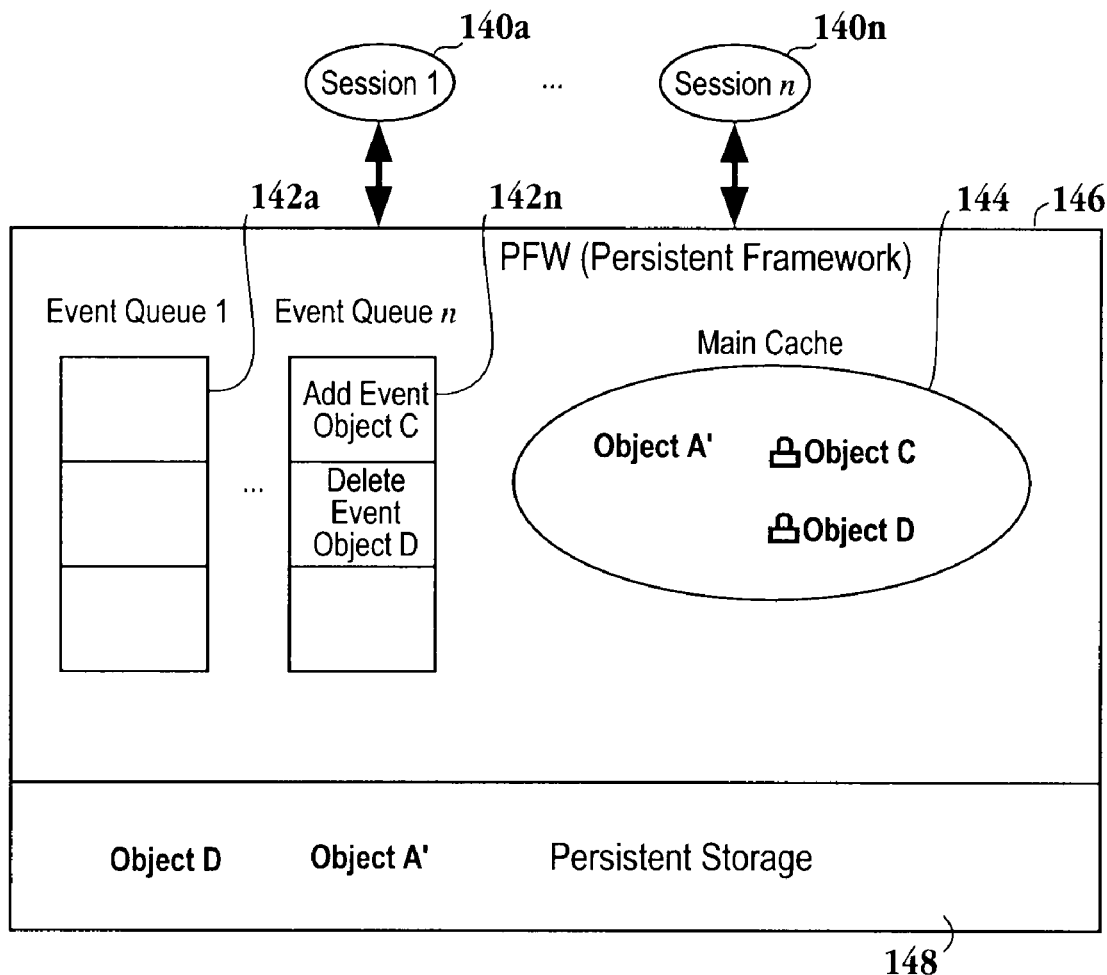

FIG. 5E illustrates an exemplary state of the persistent framework prior to a session commit for session 1 140*a* in accordance with one embodiment of the invention. Event queue 1 142*a* which is associated with session 1 140*a* includes a number of modifications to be made to persistent objects in either main cache 144 or persistent storage 148. Here, event queue 1 142*a* includes modifications which add an event object A, update event object A' and delete object B. Persistent objects A', C, B, and D all exist in main cache 144. Persistent objects B and D exist in persistent storage 148. In one embodiment, modifications for adding event object A and updating event object A' may be combined in event queue 1 142*a*, as illustrated by block 150, to save space in memory. It should be appreciated, that persistent objects in main cache 144 may be locked in order to maintain a state associated with each of the persistent objects. In one embodiment, the persistent objects of main cache 144 are locked if there is an associated activity in an event queue of the persistent framework, e.g., the modification of the event queue has not been committed. FIG. 5F illustrates a state of the persistent framework after a session commit for session 1 of FIG. 5E. In one embodiment, a session commit saves all changes made by the thread to the corresponding persistent objects. As described below, a session commit could be configured as a partial commit or rollback. That is, only the transactions for a particular state or object of an event queue are committed or rolled back. In one embodiment, a session commit operation goes through an entire event queue, starting at the beginning, and writing the changes to the persistent storage mechanism. Here, once the event has been written, it is removed from the corresponding event queue. In addition, any locks placed on the persistent objects corresponding to the events are removed. Thus, in FIG. 5F, object A' remains in main cache 144 while object B is deleted from main cache 144 and persistent storage 148 after a session commit for session 1. As can be seen, event queue 1 142*a* is then cleared from each of the events existing prior to the session commit.

Figure 5G:
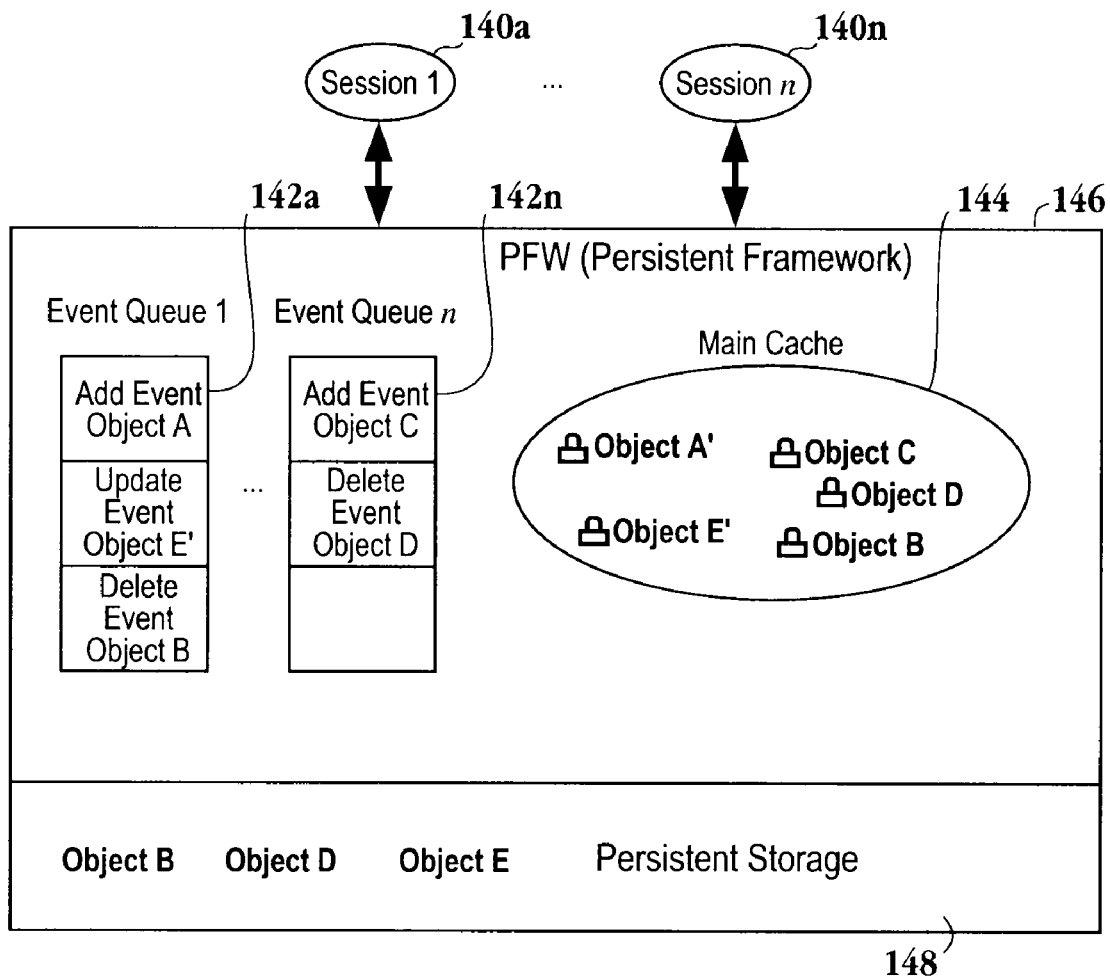
Figure 5H:
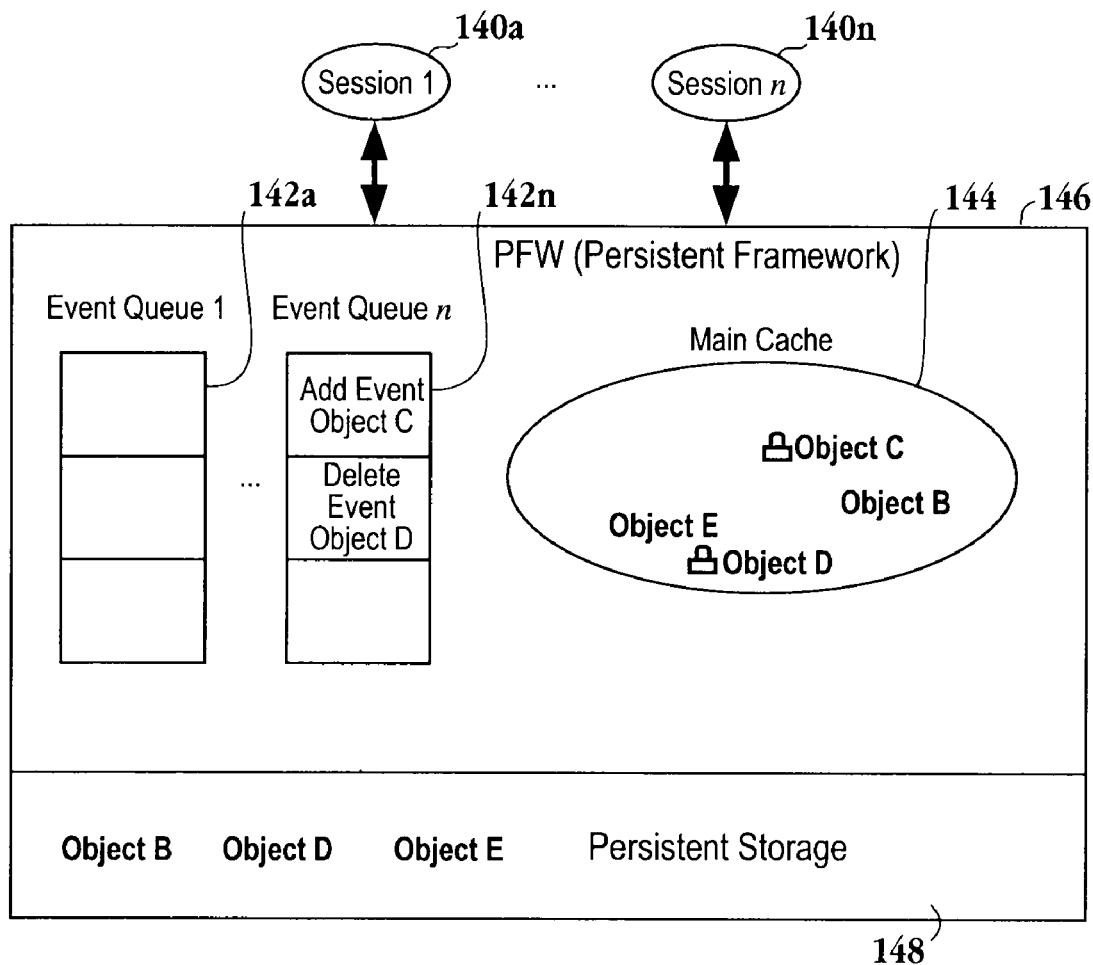

FIG. 5G illustrates a state of persistent framework prior to a session rollback for session 1 in accordance with one embodiment of the invention. Here, event queue 1 142*a* includes the modifications of adding event object A, updating event object E', and deleting event object B. FIG. 5H illustrates the persistent framework of FIG. 5G upon the completion of the session rollback for session 1. It should be appreciated that a session rollback dismisses all changes to a persistent object and reverts to the value of the persistent object that is stored in the persistent storage mechanism. Similar to the session commit operation, a session rollback may go through the entire event queue, starting at the end, and examining each event object. Thus, where the event is a delete, the event object is simply removed from the event queue. However, if the event is an update, then the old value of the corresponding persistent object is stored in the main cache. Additionally, if the event is an add, the event object is removed from both the event queue and the main cache. Accordingly FIG. 5H shows that object A has been removed from main cache 144 as well as object E'. Since the update of object E' was rolled back, object E has been restored to the main cache 144. The delete event for object B previously in event queue 1 142*a* has been removed from event queue 1.

Figure 6:
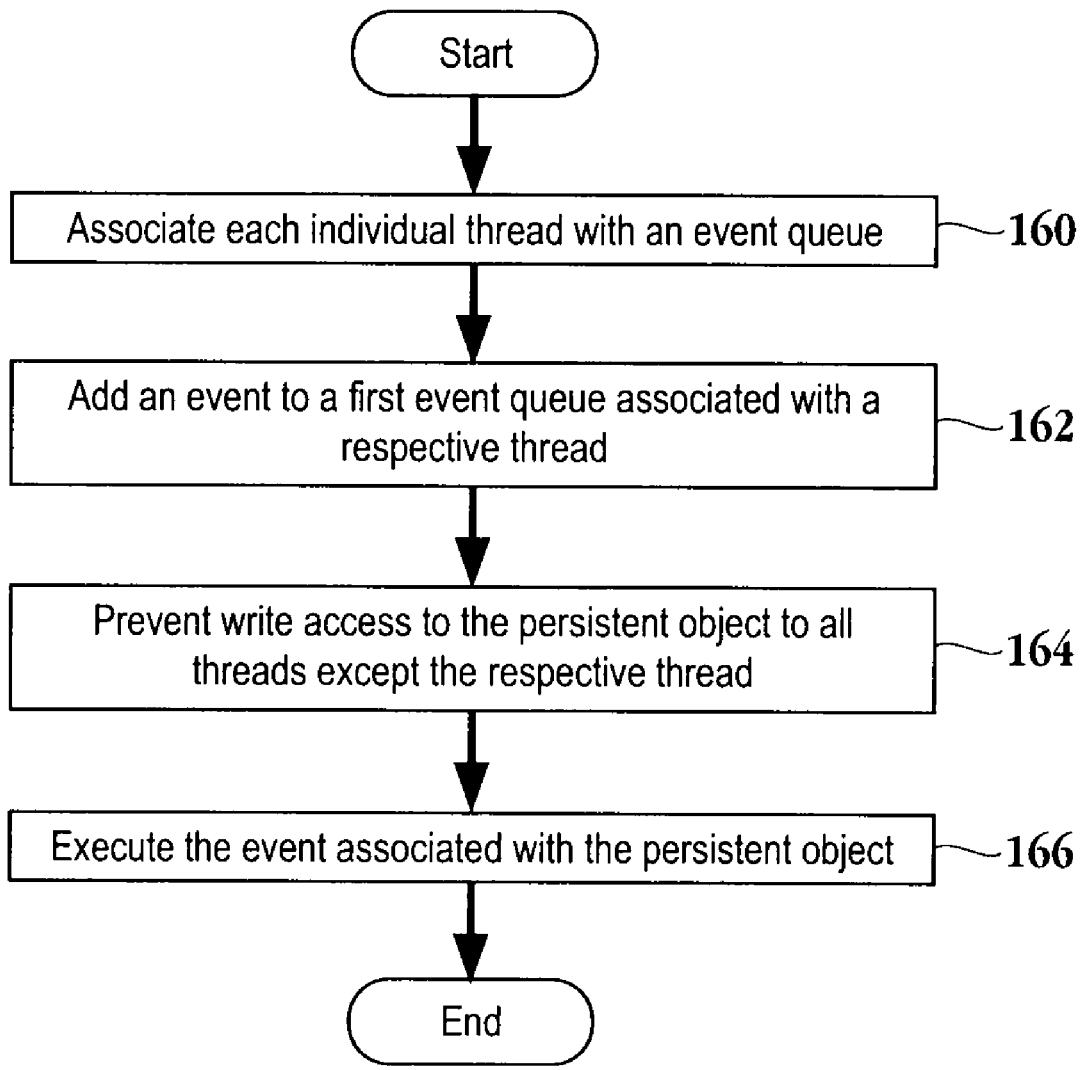
FIG. 6 is a flowchart diagram of the method operations for managing transactions associated with a persistent framework in a multi-thread environment in accordance with one embodiment of the invention.

FIG. 6 is a flowchart diagram of the method operations for managing transactions associated with a persistent framework in a multi-thread environment in accordance with one embodiment of the invention. The method initiates with operation 160 where each individual thread is associated with an event queue. As described with reference to FIGS. 3A and 3B, each event queue is associated with an individual thread. The individual thread is associated with a client. In addition, the event queues are configured to maintain the chronology of events received from a respective client. In one embodiment, the event queues are stacks maintained in memory. The method then advances to operation 162 where an event is added to a first event queue associated with a respective thread. Here, the event may be a modification, an add, or a delete event as described herein. The event may be transmitted from the client to the event queue through a distributed network, such as the Internet. It should be appreciated that event, as used herein refers to a transaction. A transaction state associated with the persistent object for which the event is related is included in the transmission of the event. Where the event is a modification or a deletion of a persistent object, the original persistent object is also included in the transmission. In one embodiment, each successive event for a particular event queue is added to the bottom of the particular event queue to maintain the order of events.

The method of FIG. 6 then proceeds to operation 164 where write access to the persistent object to which the event is related, is prevented to all threads except the respective thread associated with the first event queue. Here, a lock is placed on the persistent object so that other threads have read access to the persistent object but do not have write access. Thus, for a sales object being modified as described above, the client initiating the modification has read and write access to the corresponding persistent object. However, the remaining clients are provided with read access as the lock placed on the persistent object blocks write access for the remaining clients.

The method of FIG. 6, then moves to operation 166 where the event associated with the persistent object is executed. That is, the add, modify, delete, etc., event is executed as described above with reference to FIGS. 5A-5H. In one embodiment, a commit operation may initiate the execution of the event. The commit operation may be configured to execute all events in the event queue for a respective thread. Alternatively, the commit operation may be configured to commit a portion of the events in the event queue for the respective thread. For example, the events associated with a particular transaction state or a particular persistent object may be committed. In another embodiment, a rollback operation that dismisses all changes to a persistent object and reverts to the value of the persistent object that is stored in the persistent storage mechanism is executed. Here again, the rollback operation may be configured to rollback a portion of the events or all of the events in the event queue.

Figure 7:
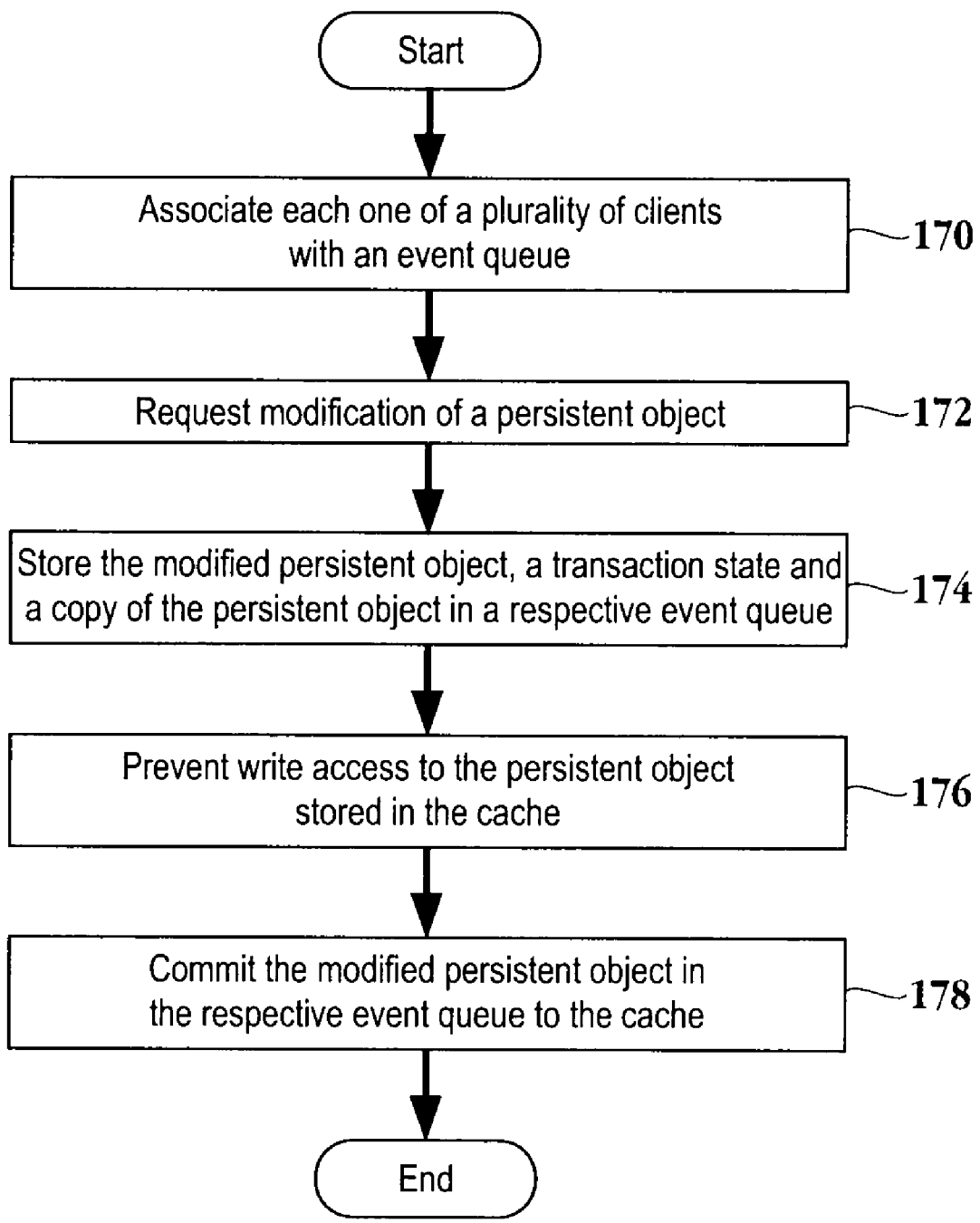
FIG. 7 is a flowchart diagram of the method operations for maintaining transaction states of persistent objects capable of being accessed by a plurality of clients in accordance with one embodiment of the invention.

FIG. 7 is a flowchart diagram of the method operations for maintaining transaction states of persistent objects capable of being accessed by a plurality of clients in accordance with one embodiment of the invention. The method initiates with operation 170, where each one of the clients are associated with a separate event queue. Thus, there is a one to one correspondence between the event queue and the clients as shown with reference to FIGS. 5A-5H. In one embodiment, the event queue is a stack assigned to a particular client and the clients transactions are recorded in the stack so that the order of the transactions is maintained. The method then advances to operation 172 where modification of a persistent object is requested. For example, a client may request an increase to a previously input sales order as described above. Here, the request is transmitted over a network to a server as discussed with reference to FIGS. 2, 3A and 3B.

The method of FIG. 7 then proceeds to operation 174, where the modified persistent object, a transaction state indicator and a copy of the persistent object are stored in a respective event queue. As mentioned above, the data is stored in a manner that preserves an order of modifications to the objects stored in the event queue, e.g., each modification may come into the bottom of the event queue. It should be appreciated that the transaction state indicator points out whether the persistent object has been modified since it was last read from the persistent storage mechanism. The method then moves to operation 176 where write access to the persistent object stored in a cache or persistent storage is prevented. In one embodiment, a lock is placed on the persistent object in the cache or persistent storage to allow only read access to the persistent object. Therefore, any other client, threads, sessions, etc. requesting access to the persistent object having the lock, will be provided read access and not write access to the data. In another embodiment, if a persistent object is locked, the object remains in the main cache until a commit or rollback operation is performed by the session which locked the object. After the commit or rollback operation, the lock is removed and other sessions are allowed to perform modifications to the object.

Still referring to FIG. 7, the method advances to operation 178 where the modified persistent object in the respective event queue is committed to the main cache. Here, if the original object was changed, the changed object is stored in the cache and the original object is removed from the cache. If the modification is to delete the original object, then the original object is removed from the cache. Of course, if the modification is to add a new object, then that new object is placed into the cache. It should be appreciated that an alternative to the commit operation is a rollback operation, which essentially places the objects associated with the respective event queue in an original state prior to the modification as discussed with reference to the examples illustrated in FIGS. 5A-5H. It should be appreciated that by including the original object with the modified object in the event queue, the rollback operation is readily executed as the needed data is in the event queue. Furthermore, the commit and rollback operations may be structured to execute for the entire event queue, i.e., an atomic process. Alternatively, the commit and rollback operations may be structured to execute for a portion of the event queue, i.e., a partial commit or partial rollback. The partial commit or rollback may be based on a transaction state or combination of transaction states, e.g., all old dirty states, etc., or a particular object or combination of objects.

In summary, the above described invention allows for a method and system for managing the modification of persistent objects in a multi-user environment associated with a persistent framework. Each client is associated with a separate event queue, allowing for a single cache in the persistent framework. Thus, looking up or searching for a persistent object is simplified as there is a single cache. Additionally, a modification of a persistent object exists in just one event queue due to the lock being placed on a persistent object associated with the event queue, thereby simplifying a search for a modification to a persistent object. Inclusion of the transaction state indicator and the original persistent object with the modified persistent object in the event queue enables simplified commit and rollback operations, as all the needed data is in a single block of one event queue. Therefore, commits and rollbacks for individual threads are supported under the management technique described herein. The order of the modifications, also referred to as events, is preserved within each event queue, allowing for a partial commit or rollback based on the order, i.e., the first x modifications, the last y modifications and so on. One skilled in the art will appreciate that a semiconductor chip including logic gates or a finite state machine may be designed to provide the functionality discussed above. For example, a hardware description language (HDL) can be employed to synthesize the firmware and the layout of the logic gates for providing the necessary functionality described herein.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable storage medium that is executable by a computer. The computer readable storage medium is any data storage device that can store data that can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable storage medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for managing transactions associated with a persistent framework in a multi-thread environment, comprising:
    associating each individual thread with a corresponding event queue;
    adding an event to a first event queue associated with a respective thread, the event associated with a persistent object;
    preventing write access to the persistent object to all threads except the respective thread; and
    executing the event in the first event queue associated with the persistent object.

2. The method of claim 1, wherein the event is selected from the group consisting of a deletion of the persistent object, a change of the persistent object or an addition of a new persistent object.

3. The method of claim 1, wherein the method operation of adding an event to a first event queue associated with a respective thread, the event associated with a persistent object includes,
    preserving an order of the event in the first event queue.

4. The method of claim 1, wherein the method operation of preventing write access to the persistent object to all threads except the respective thread includes,
    associating a lock with the persistent object in a cache associated with each event queue.

5. The method of claim 1, further comprising:
    adding a plurality of events to the first event queue; and
    executing a portion of the plurality of events.

6. A computer implemented method for maintaining transaction states of persistent objects in a multi-user environment, comprising:
    receiving a request to modify a persistent object stored in a main cache;
    copying the persistent object from the main cache to an event queue associated with the request;
    storing a modified persistent object and a corresponding transaction state with the persistent object in the event queue;
    writing the modified persistent object to the main cache and a persistent storage; and
    removing the persistent object from the main cache and the persistent storage.

7. The method of claim 6, further comprising:
    preventing write accessibility to the persistent object stored in the main cache when the persistent object is copied from the main cache to the event queue.

8. The method of claim 6, wherein each user of the multi-user environment is associated with a separate event queue.

9. The method of claim 6, further comprising:
    preserving an order of receipt for the request to modify the persistent object by adding each successive request associated with the event queue to a bottom of the event queue.

10. The method of claim 6, wherein the event queue corresponds to a single user of the multi-user environment.

* * * * *